United States Patent [19]
Gaddis et al.

[11] Patent Number: 5,797,480
[45] Date of Patent: Aug. 25, 1998

[54] HANGER BEARING

[75] Inventors: Donald L. Gaddis; Roy Gaddis, both of Solon; Myland D. Hepker, Urbana, all of Iowa

[73] Assignee: Courtesy Enterprises, Inc., Cedar Rapids, Iowa

[21] Appl. No.: 629,013

[22] Filed: Apr. 8, 1996

[51] Int. Cl.[6] .................................................. B65G 33/32
[52] U.S. Cl. ........................ 198/672; 198/860.4; 414/526
[58] Field of Search ............................... 198/672, 860.4; 414/326, 526; 384/434

[56] References Cited

U.S. PATENT DOCUMENTS

| 665,262 | 1/1901 | Peck | 198/672 |
|---|---|---|---|
| 715,448 | 12/1902 | Willson | 198/672 |
| 2,279,201 | 4/1942 | Kozak et al. | 198/672 |
| 2,585,169 | 2/1952 | Potter | 414/526 |
| 2,770,376 | 11/1956 | Zinn | 414/526 |
| 3,031,064 | 4/1962 | Kline | 198/860.4 |
| 4,733,824 | 3/1988 | Alexander | 198/860.4 |
| 5,085,025 | 2/1992 | Gaddis | 414/526 |

*Primary Examiner*—Joseph E. Valenza
*Attorney, Agent, or Firm*—Zarley,McKee,Thomte,Voorhees & Sease; Dennis L. Thomte

[57] ABSTRACT

A hanger bearing is provided for use with a bulk feed truck or trailer having a discharge auger located in an auger trough at the lower end of the feed body. The hanger bearing includes a threaded upper end which is vertically adjustably secured to a hanger bearing support positioned above the discharge auger. A split bearing is mounted at the lower end of the hanger bearing which removably embraces the auger shaft of the discharge auger to rotatably support the discharge auger in the auger trough. An access opening is provided in the auger trough below the hanger bearing and is selectively closed by an access door so that the hanger bearing may be replaced or serviced should the occasion arise.

12 Claims, 4 Drawing Sheets

HANGER BEARING

BACKGROUND OF THE INVENTION

1. Field of the Invention

This invention relates to a hanger bearing and more particularly to a hanger bearing which may be used to support a horizontally disposed auger located in the bottom of a bulk feed delivery trailer or truck.

2. Description of the Related Art

It is customary, particularly in agricultural areas, for trucks having V-shaped bottoms to be divided into a plurality of compartments so that one truck can carry a plurality of different quantities of particulate material, such as different feeds or different fertilizers, in various compartments of the truck. The V-shaped truck body is normally equipped with an elongated, horizontally disposed auger at the point of the "V" for unloading purposes. Heretofore, the augers were normally supported by a plurality of horizontally spaced hanger bearings which suspended the auger slightly above the auger trough to prevent damage to the material being conveyed and to prevent damage to the auger trough and to the auger itself. In the event of failure of one of the hanger bearings, which normally occurs when the truck body or compartment therein is full of feed or fertilizer, it is necessary to manually empty the compartment in which the hanger bearing is positioned, so that access to the hanger bearing may be gained. Once access to the hanger bearing is achieved, the auger must be at least partially disassembled to enable the hanger bearing to be removed from the auger system. As seen in FIG. 2 of the drawings, the prior art hanger bearing includes a central opening extending therethrough which receives the auger shaft. In order for the prior art hanger bearing to be removed from the auger shaft, the auger shaft must be separated so that the hanger bearing may be removed therefrom. Obviously, the necessity of emptying the compartment in the truck body and the necessity of separating the auger to enable the hanger bearing to be removed and replaced involves substantial time and effort.

SUMMARY OF THE INVENTION

The hanger bearing of this invention is ideally suited for use with the auger system of a bulk feed trailer or truck. The bulk feed truck or trailer normally includes a substantially horizontally disposed auger rotatably positioned in a trough located at the lower end of the feed body or compartments therein. In the preferred embodiment, a bearing support is positioned above the auger for supporting a plurality of hanger bearings thereon. Each of the hanger bearings has an upper end which is operatively secured to the bearing support and which has a lower end which rotatably supports the auger shaft of the auger positioned therebelow. The lower end of the hanger bearing includes a split bearing member which selectively removably receives the auger shaft therein. The trough in which the auger is disposed has an access opening formed therein below the hanger bearing to provide access to the hanger bearing. An access door is operatively movably mounted on the trough for selectively closing the access opening. Should a hanger bearing fail, it is not necessary to empty the compartment or the body in which the hanger is positioned. The operator simply opens the access door below the failed bearing and separates the split bearing to permit the hanger bearing to be removed from the auger. A new split bearing member may then be substituted for the failed bearing. The access door is then closed.

A modified form of the hanger bearing is also disclosed wherein the hanger bearing is secured to the auger trough below the auger and extends upwardly therefrom for support of the auger. When the modified hanger device is employed, the access opening in the auger trough is preferably positioned in an offset fashion with respect to the hanger bearing.

It is therefore a principal object of the invention to provide an improved hanger bearing.

Still another object of the invention is to provide a hanger bearing for supporting a discharge auger wherein the hanger bearing has a split bearing member thereon to facilitate the convenient replacement of the split bearing member should the bearing fail.

Still another object of the invention is to provide a hanger bearing for use with a bulk feed truck or trailer wherein the hanger bearing may be replaced, should it fail, without the necessity of emptying the material contained within the associated compartment or feed body.

Still another object of the invention is to provide a hanger bearing of the type described which is durable in use.

These and other objects of the present invention will be apparent to those skilled in the art.

DESCRIPTION OF THE PREFERRED EMBODIMENT

Figure 1:
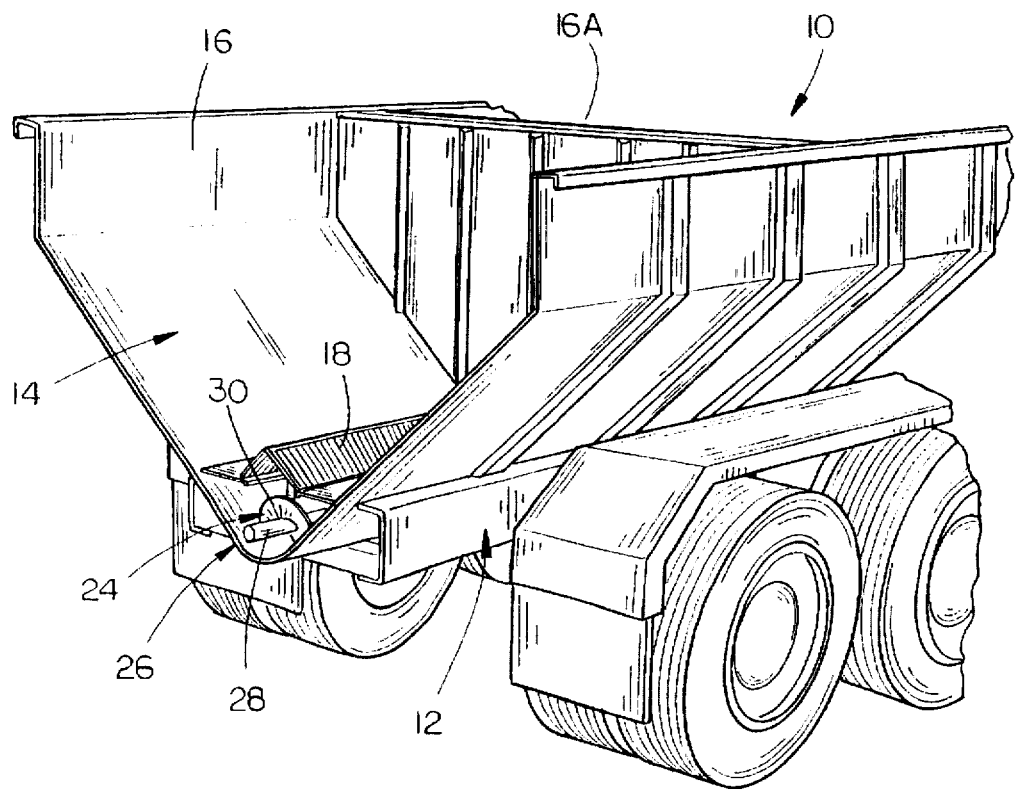
FIG. 1 is a partial rear perspective view of a feed body including an elongated auger conveyor located in an auger trough.

The numeral 10 refers generally to a feed truck or trailer including a wheeled frame means 12 and a body 14 positioned thereon which may be divided into compartments 16, 16A, etc. An inverted V-shaped baffle 18 is provided in the lower end of each compartment and has a pair of doors 20 and 22 associated therewith which may be opened or closed as will be described in more detail hereinafter.

The numeral 24 refers to an elongated discharge auger which is positioned in a discharge trough 26. Normally, the discharge auger 24 includes an auger shaft 28 having flighting 30 provided thereon in conventional fashion. Normally, the discharge auger 24 is divided into auger sections to facilitate installation, repair and replacement of the discharge auger. The numeral 32 refers to a bearing support for supporting the hanger bearing thereon which in turn supports the discharge auger so that it does not rest upon the inside (upper) surface of the trough bottom to prevent damage to the trough, auger or the material being conveyed.

Figure 2:
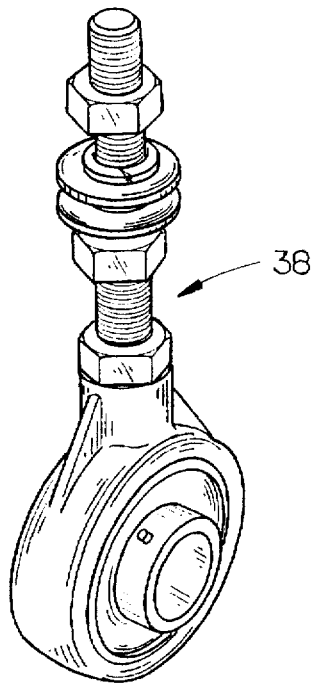
FIG. 2 is a perspective view of a prior art hanger bearing for supporting the auger in the trough of FIG. 1.
Figure 3:
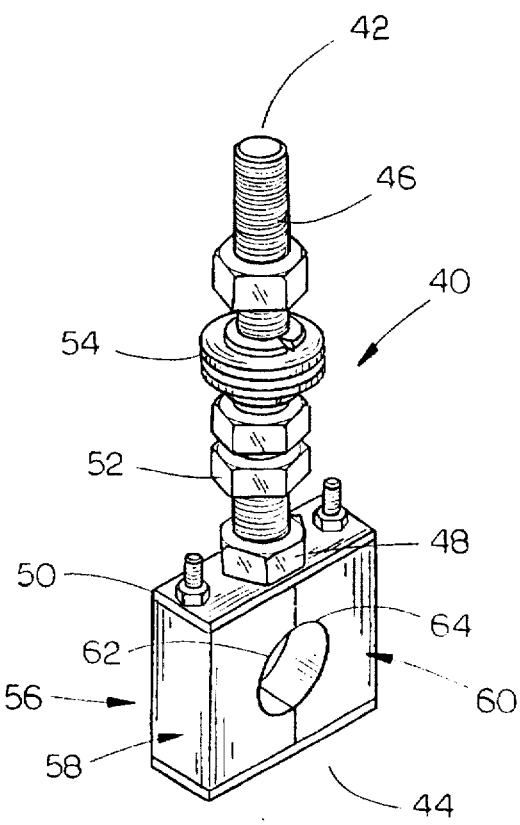
FIG. 3 is a perspective view of the hanger bearing of this invention.

In normal use, material is contained within the compartment 16, 16A, etc. When it is desired to discharge material from one of the compartments, the individual doors 20 and 22 located within that compartment are lowered by means of the cables 34 and 36 so that the material in the compartment may flow to the discharge auger 24. In the prior art system, should a hanger bearing fail, which normally occurs when the compartment is at least partially full of material, the material in the compartment must be manually removed from the compartment to gain access to the failed hanger bearing. Once the material is emptied from the compartment, the conventional prior art hanger bearing 38 of FIG. 2 must be removed from the auger 24. Inasmuch as the conventional prior art hanger bearing 38 completely embraces the auger shaft and cannot be separated, it is necessary to separate the appropriate sections of the discharge auger 24 so that the auger shaft may be removed from the bearing. Once the auger shaft is removed from the bearing, the bearing is then completely replaced.

Figure 4:
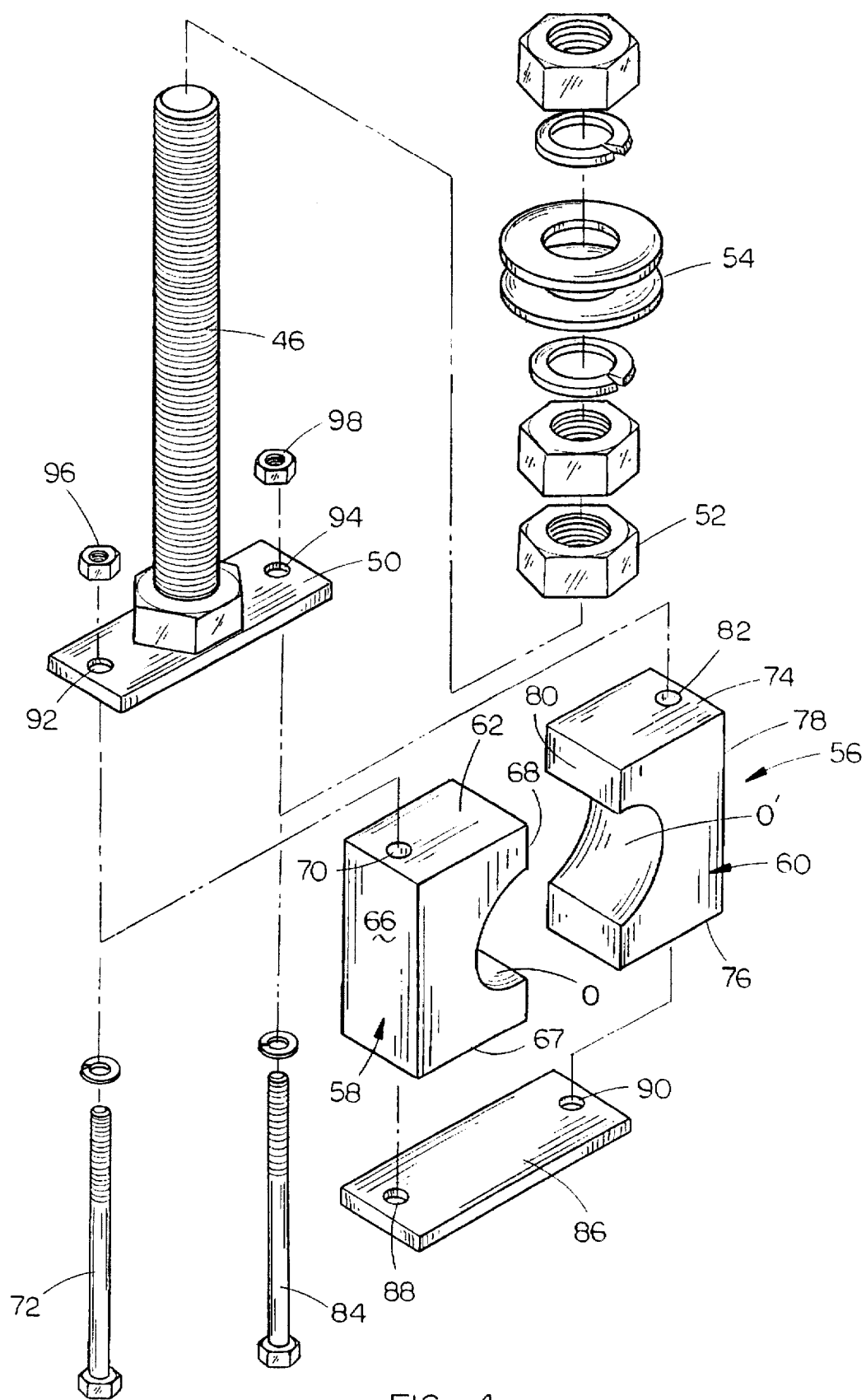
FIG. 4 is an exploded perspective view of the hanger bearing of this invention.
Figure 5:
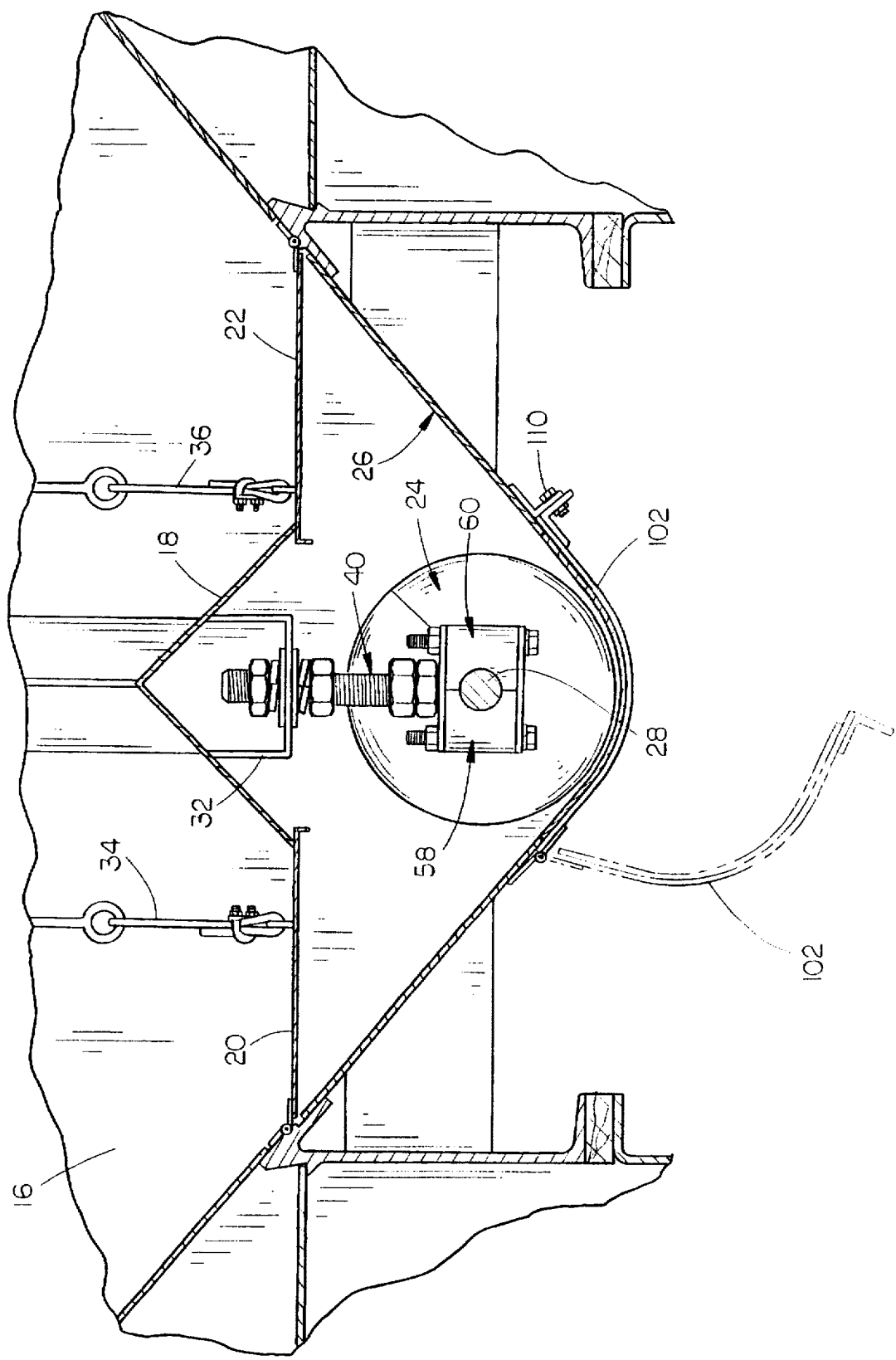
FIG. 5 is a vertical sectional view of the feed body of FIG. 1 having the hanger bearing of this invention mounted thereon.
Figure 6:
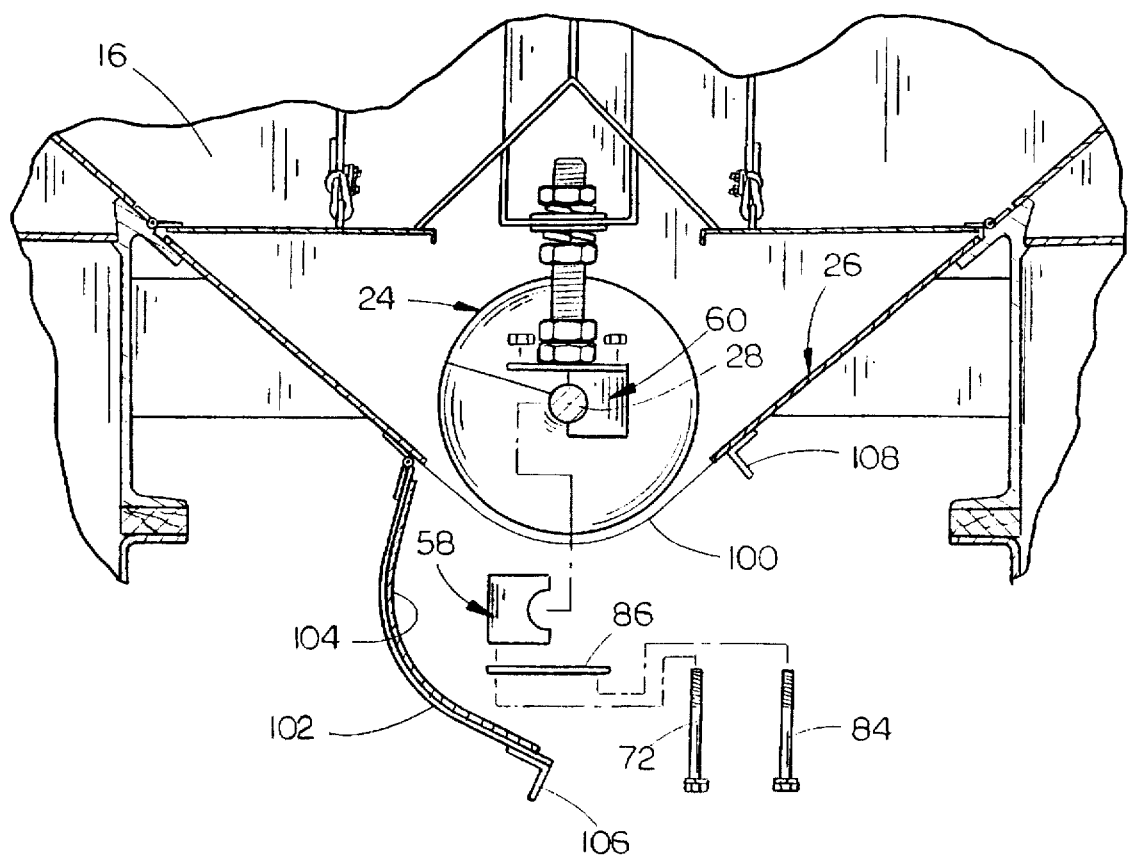
FIG. 6 is a view similar to FIG. 5 but which illustrates the split bearing member on the hanger bearing being replaced.

In an effort to eliminate the disadvantages of the prior art hanger bearing 38, applicants have devised a novel hanger bearing which is illustrated in FIGS. 3-7 and which is referred to generally by the reference numeral 40. For purposes of description of the hanger bearing 40 of FIG. 3 and the means of positioning the same, as illustrated in FIGS. 5 and 6, bearing 40 will be described as including an upper end 42 and a lower end 44. As will be described in the embodiment of FIG. 7, the hanger bearing 40 is rotated so that its upper end 42 becomes its lower end and its lower end becomes its upper end.

Bearing 40 includes an elongated threaded bolt portion 46 having its lower end threaded into a nut 48 which is welded to top plate 50. Appropriate nuts 52 and washers 54 are utilized as required. The numeral 56 refers to a split bearing member including bearing portions 58 and 60 which have semi-circular openings O and O' formed in the inner sides thereof. For purposes of description, bearing member 58 will described as including an upper end 62, lower end 64, outer end 66 and inner end 68. The semi-circular opening O is formed in inner end 68, as clearly illustrated in FIG. 4. Bearing member 58 has an elongated opening 70 extending therethrough between its upper and lower ends adapted to receive an elongated bolt member 72 extending upwardly therethrough.

For purposes of description, bearing member 60 will be described as including an upper end 74, lower end 76, outer end 78 and inner end 80. As seen in FIG. 4, the semi-circular opening O' is formed in the inner end 80 of bearing member 60. When the bearing members 58 and 60 are assembled, the semi-circular openings O and O' create a circular opening which rotatably embraces the auger shaft 28 of discharge auger 24, as seen in FIG. 5. Bearing member 60 includes an elongated opening 82 formed therein which extends between its upper and lower ends and which is adapted to receive the elongated bolt member 84 extending upwardly therethrough. Bearing member 56 also includes a bottom plate 86 having a pair of openings 88 and 90 formed therein which are adapted to receive the bolts 72 and 84 extending upwardly therethrough. Top plate 50 also includes a pair of openings 92 and 94 formed therein adapted to receive the upper ends of the bolt members 72 and 84. The bolt members 72 and 84 maintain the bearing member in its assembled condition by means of the nuts 96 and 98.

Preferably, the auger trough 26 is provided with an access opening 100 formed therein which is located beneath each of the hanger bearings 24 and which is selectively closed by means of an access door 100. Preferably, that portion of the trough which was removed therefrom to create the access opening 100 is welded or otherwise secured to the inside surface of the access door 102, as illustrated in FIG. 6 and as designated by the reference numeral 104, so that the interior surface of the trough, when access door 102 is closed, will be smooth and continuous. Preferably, an angle member 106 is secured to one end of the access door 102 and an angle member 108 is secured to the exterior surface of the trough 26 so that the angles 106 and 108 will be closely positioned adjacent one another, as illustrated in FIG. 5, when the access door 102 is closed so that a retaining bolt or pin 110 may be extended therethrough to maintain the access door 102 in its closed position.

Assuming that the hanger bearing 40 located in compartment 16 should fail or require replacement through wear, and further assuming that the compartment 16 is at least partially full of material, the hanger bearing 40 may be serviced as follows. The gates 20 and 22 would normally be moved to the position of that shown in FIG. 5 so that a limited amount of material is present in the auger trough in the area adjacent the hanger bearing 40 which is to be replaced or repaired. Access door 102, located below the affected hanger bearing 40, is then opened which will result in a small amount of material flowing through the access opening 100. The repair person may then remove the bolts 72 and 74 so that the bearing members 58 and 60 may be removed from the auger shaft 28 without disassembling the discharge auger. New bearing members 58 and 60 are then assembled on the auger shaft 28 and on the hanger bearing 40. Access door 102 is then closed and the discharge auger may then be placed back into service. It can therefore be seen that the improved hanger bearing 40 of this invention enables the bearing on the hanger bearing to be replaced, without the necessity of emptying the material from the compartment thereabove and without the necessity of disconnecting or disassembling the discharge auger.

Figure 7:
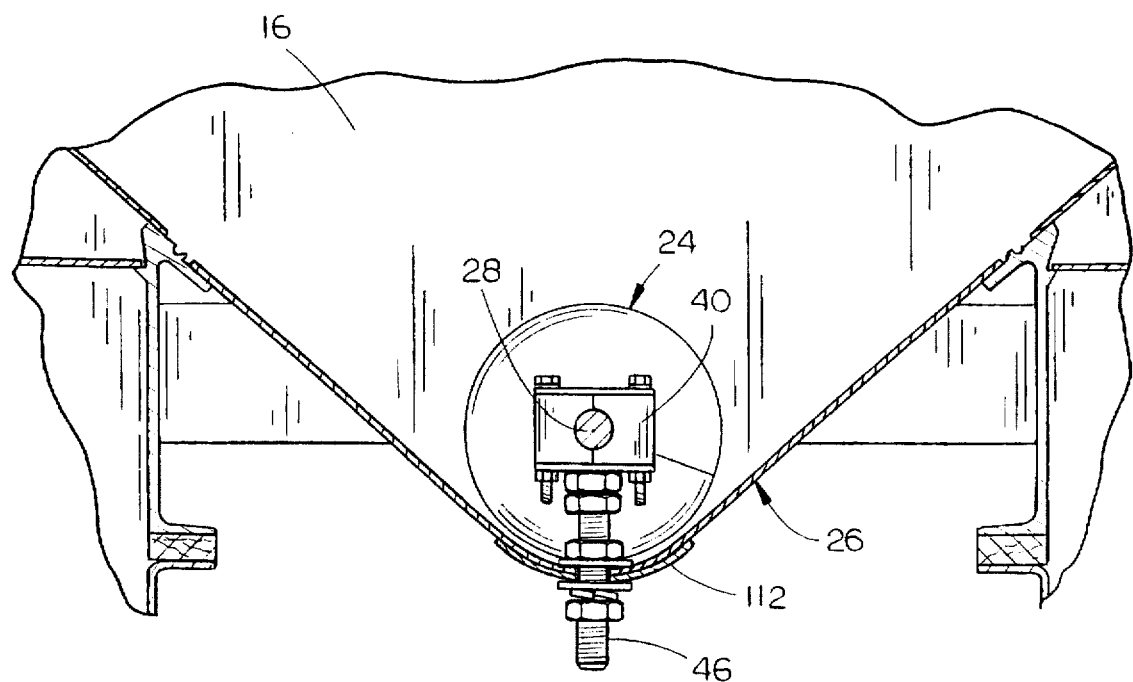
FIG. 7 is a view similar to FIGS. 5 and 6 except that the hanger bearing of this invention extends upwardly from a reinforced portion of the trough.

FIG. 7 illustrates a slightly different positioning of the hanger bearing 40. The placement of the hanger bearing 40, in FIG. 7, would be utilized in those situations where an appropriate bearing support 32 is not present above the discharge auger 24. In such a situation, a reinforcing plate 112 is positioned beneath the bottom of the trough 26 and registering openings are formed therein to facilitate the insertion of the bolt member 46 therethrough to enable the bearing member 40 to support the discharge auger 24 from a position below the discharge auger 24 rather than from a position above the discharge auger, as illustrated in FIGS. 5 and 6. In those situations where the hanger bearing 40 is positioned as illustrated in FIG. 7, it is preferred that the access opening 100 in the trough 26 be positioned either forwardly or rearwardly of the hanger bearing 40 so that convenient access may be provided for the repair or replacement of the hanger bearing 40.

Preferably, hanger bearing 40, except for bearing portions 58 and 60, is constructed of a suitable metal material. Preferably, bearing portions 58 and 60 are comprised of a plastic material such as Nylatron NSM. Although the preferred embodiment of the invention is to have the bearing portions 58 and 60 positioned side-by-side, it is possible that bearing portion 58 could be positioned above bearing portion 60 if so desired.

Thus it can be seen that a novel hanger bearing has been described which is particularly well adapted for use with discharge augers located in the bottom of a bulk feed truck or trailer. It can therefore be seen that the invention accomplishes at least all of its stated objectives.

We claim:

1. In combination:
   a substantially horizontally disposed conveyor comprising an elongated trough having a semi-circular bottom, a conveyor auger rotatably positioned in said trough and which includes an elongated shaft having auger flighting thereon;

at least one bearing support positioned above said conveyor auger;

a substantially vertically disposed hanger bearing for rotatable supporting said conveyor auger in said trough, said hanger bearing having an upper end operatively secured to said bearing support and having a lower end which rotatably supports said auger shaft;

said trough having an access opening formed therein below said hanger bearing to provide access to said hanger bearing;

and an access door operatively movably mounted on said trough for selectively closing said access opening;

said hanger bearing including a vertically disposed support member having upper and lower ends, said upper end of said vertically disposed support member being removably secured to said hanger support, said lower end of said vertically disposed support member having a horizontally disposed top plate secured thereto;

said hanger bearing including a split bearing member at its lower end which selectively removably receives said auger shaft therein;

said split bearing member including first and second bearing portions positioned beneath said top plate, each of said first and second bearing portions having a semi-circular opening formed therein which rotatably receives said auger shaft;

a bottom plate positioned below said first and second bearing portions; and connector means extending through said bottom plate, said bearing portions and said top plate.

2. The combination of claim 1 wherein said access opening is provided in said trough directly below said hanger bearing.

3. The combination of claim 1 wherein said connector means comprises a pair of bolt and nut connectors and wherein said bolt and nut connectors are accessible through said access opening.

4. The combination of claim 1 wherein said connector means is accessible through said access opening.

5. The combination of claim 1 wherein said bearing portions are comprised of a plastic material.

6. The combination of claim 1 wherein each of said bearing portions includes an upper end, a lower end, an outer end and an inner end, said semi-circular openings being formed in the inner ends of said bearing portions.

7. In combination:

a substantially horizontally disposed conveyor comprising an elongated trough having a semi-circular bottom, a conveyor auger rotatably positioned in said trough and which includes an elongated shaft having auger flighting thereon;

a substantially vertically disposed hanger bearing for rotatably supporting said conveyor auger in said trough, said hanger bearing having a lower end operatively secured to said semi-circular bottom of said trough and having an upper end which rotatably supports said auger shaft;

said trough bottom having an access opening formed therein below said hanger bearing to provide access to said hanger bearing in said trough;

and an access door operatively movably mounted on said trough for selectively closing said access opening;

said hanger bearing including a vertically disposed support member having upper and lower ends, said upper end of said vertically disposed support member being removably secured to said trough bottom, said upper end of said vertically disposed support member having a horizontally disposed bottom plate secured thereto;

said hanger bearing including a split bearing member at its lower end which selectively removably receives said auger shaft therein;

said split bearing member including first and second bearing portions positioned above said bottom plate, each of said first and second bearing portions having a semi-circular opening formed therein which rotatably receives said auger shaft;

a top plate positioned above said first and second bearing portions; and connector means extending through said bottom plate, said bearing portions and said top plate.

8. The combination of claim 7 wherein said access opening is provided in said trough longitudinally of said hanger bearing.

9. The combination of claim 7 wherein said connector means comprises a pair of bolt and nut connectors and wherein said bolt and nut connectors are accessible through said access opening.

10. The combination of claim 7 wherein said connector means is accessible through said access opening.

11. The combination of claim 7 wherein said bearing portions are comprised of a plastic material.

12. The combination of claim 7 wherein each of said bearing portions includes an upper end, a lower end, an outer end and an inner end, said semi-circular openings being formed in the inner ends of said bearing portions.

\* \* \* \* \*